3,764,301
OPERATION OF A BLAST FURNACE

Stephen William Kenneth Morgan, Avonmouth, England, assignor to Metallurgical Processes Limited, Nassau, Bahamas, and Imperial Smelting Corporation (N.S.C.) Limited, London, England
Filed Nov. 30, 1970, Ser. No. 93,664
Claims priority, application Great Britain, Dec. 3, 1969, 59,141/69
Int. Cl. B21k 1/02, 19/00
U.S. Cl. 75—87        16 Claims

ABSTRACT OF THE DISCLOSURE

A zinc or zinc/lead blast furnace is operated by selecting as fuel lump carbonaceous material of reduced reactivity with carbon dioxide at 1000° C.

---

Figure 1:
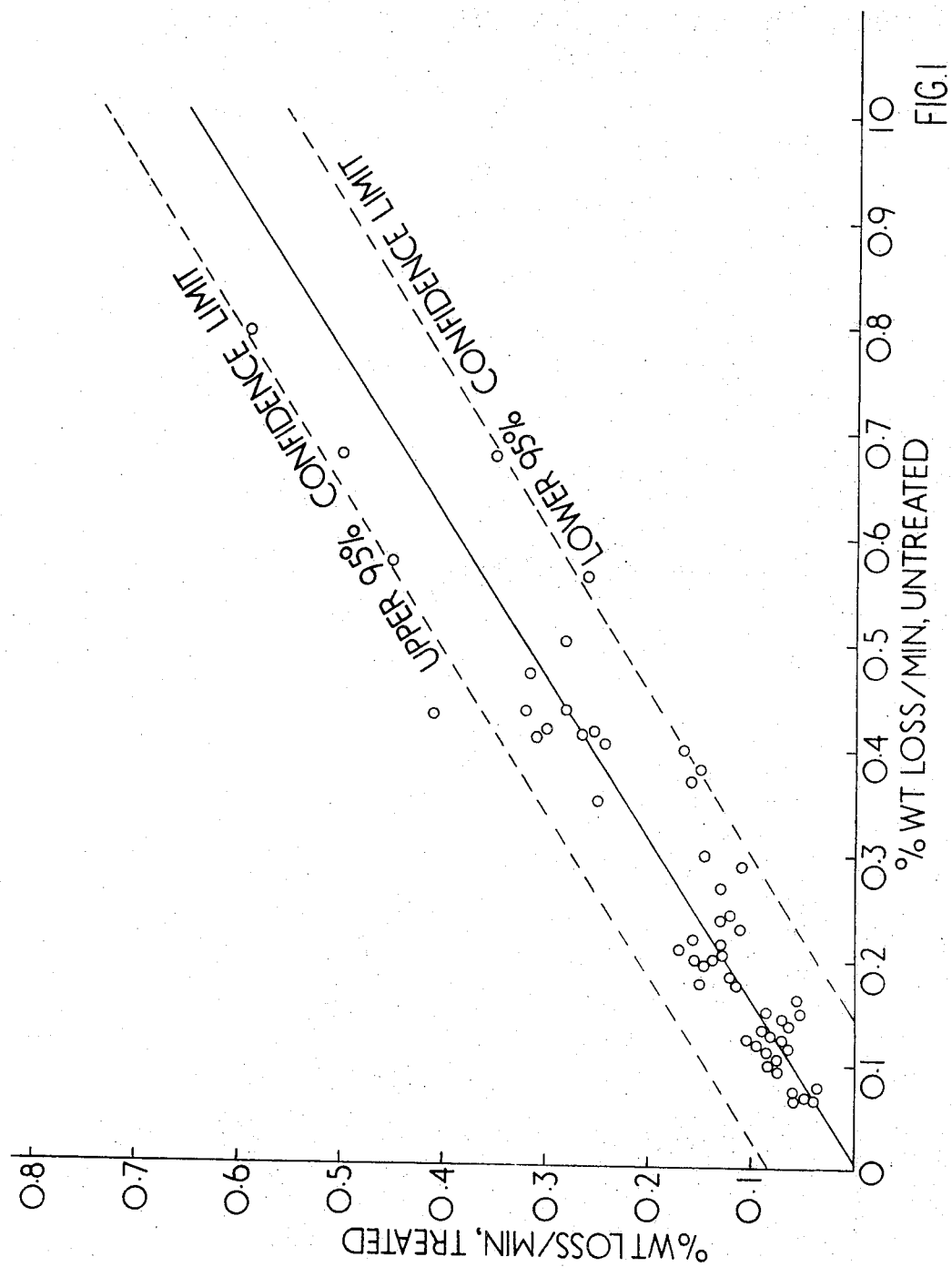

This invention relates to the operation of a zinc, or zinc/lead, blast furnace.

In a blast furnace an oxidic charge and a carbonaceous heat-producing and metallurgically reducing material in lump form (usually metallurgical coke, either as-fired or as preformed briquettes) are charged together with a flux into a vertical furnace subjected to blast air at the bottom.

In an iron blast furnace the molten reduced iron and the slag are removed from the bottom of the furnace and blast gases from the top. In a zinc blast furnace slag is removed from the bottom and vaporised zinc is included in the blast gases from the top of the furnace, from which gases the zinc may be recovered by absorption in a spray of molten lead droplets. In a lead-zinc blast furnace, normally used in practice, lead (and conceivably copper and other metals in minor amounts) is additionally removed from the bottom of the furnace as a molten lead bullion.

Metallurgical coke and other lump carbonaceous materials of this nature are expensive and in short supply. Attempts have been made with iron blast furnaces to supplement the coke by injecting pulverised solid carbonaceous fuel, or liquid or gaseous hydrocarbons, for example with the blast air. However, these expedients have been found unsuccessful with zinc blast furnaces (or zinc/lead blast furnaces) since they affect the composition of the outgoing blast gases detrimentally and thus affect recovery of vaporized zinc.

In our observations on the zinc or zinc/lead blast furnace we have found that the useful part of the coke or like lump material fed to such a furnace may be represented in terms of the proportion of carbon which reaches the tuyere zone for inlet of blast air near the bottom of the furnace. Carbon lost in the cooler (upper) parts of the shaft does not contribute to the sensible heat or useful reducing carbon monoxide requirements of the furnace. The sensible heat is required in order to melt both slag and metal being tapped from the furnace hearth and to vaporise the zinc formed by reduction.

Carbon will react with carbon dioxide to form a carbon monoxide according to the equation $$C + CO_2 \rightarrow 2CO$$

If the temperature is below 1000° C., this CO will not reduce ZnO and hence can be termed "useless CO." Moreover, the reaction is endothermic. Accordingly, any such reaction between carbon dioxide and hot carbon in the upper part of the furnace shaft tends to waste carbon both by virtue of the carbon lost and the consumption of additional carbon to compensate for the loss of heat in the endothermic reaction. It is therefore an economic penalty.

As a result of this observation we have realised that the operation of a zinc or zinc/lead blast furnace can be improved by selection of an optimum type of fuel not hitherto recognized as being especially valuable in this context.

The present invention accordingly provides a method of operating a zinc or zinc/lead blast furnace by feeding into the top of a furnace shaft oxidic materials and/or oxidic zinc/lead materials together with a carbonaceous fuel and reducing agent, and at the bottom of said shaft a supply of blast air, wherein there is used as fuel a carbonaceous heat-producing and metallurgically reducing material in lump form, which has been subjected to a treatment to reduce its reactivity to carbon dioxide at 1000° C.

The fuel can be either a normal fired metallurgical coke, usually screened and graded, or a pre-formed briquetted material made from relatively small-sized carbonaceous material. Alternatively it can be part of a mixed briquette feed comprising carbon, oxidic metallurgeous material, slagging materials and binder.

While it is not desired to limit the broad scope of the invention as set forth above it appears that the preferable fuel is one in which a physical barrier material has been provided, to prevent or hinder access of carbon dioxide to the carbon in the fuel whilst in the upper part of the furnace. This material can coat the whole lump of fuel; alternatively or additionally it can coat the walls of the pores or interstices within the lump of fuel. Such a barrier should disintegrate, melt or otherwise disappear in the lower part of the furnace.

Generally speaking such a physical or mechanical barrier can be an inorganic material inert to the smelting process; however, it is possible to provide a barrier of carbon of smaller pore size (or with no pores) which will not react appreciably until it reaches the lower part of the furnace.

For example, lumps of fuel can be contacted (e.g. by dipping or spraying) with an aqueous solution or suspension of a suitable inorganic acid, base or salt which leaves a solid barrier residue on drying and/or heating. Examples of these materials are boric acid, calcium oxide or hydroxide or carbonate, silicates such as sodium silicate or borates such as borax.

Alternatively or additionally, the lumps of fuel can be contacted with (e.g. dipped in or sprayed with) molten pitch or tar and preheated, before use in the furnace, to drive off volatile materials and form a carbon seal. In this instance the feed to the furnace is without a coating of non-carbonaceous materials, but due to the greatly reduced surface area, which converts the coke or briquettes from a porous sponge-like material to a substantially smooth material, the surface area available for the carbon/carbon dioxide reaction is markedly reduced to a level sufficient to make the material which otherwise is too reactive, useful in the furnace.

When conventional fired coke is used, the normal preheating before the coke is charged to the furnace is utilized to drive off any water present and leave the inorganic material, or to drive off volatile material from the pitch or tar. Spraying of preheated coke can also be used, and when briquettes are used the solution or suspension can be sprayed on the hot briquettes for the same purpose. Since, however, pitch or tar does not lend itself to such a procedure it would be necessary to cool the briquettes after forming, coat them with pitch or tar, and re-heat before charge. This is expensive and accordingly the use of formed briquettes with pitch or tar is not preferable. However, if formed briquettes are to be used it is possible to incorporate the inorganic materials referred to above (either as such or in aqueous solution or suspension) into the mixture from which the briquettes are to be made.

The reactivity of the material may be measured by a variety of standardized procedures; the one preferred is to determine the rate of loss of weight of a crushed sample of coke or other carbon in a stream of pure carbon dioxide when heated to 1000° C. By this technique the rate of loss of weight of the coke can be determined. A measurement under these conditions which gives a rate of weight loss in excess of 0.20 grams/sec. per cubic centimeter of carbon dioxide usually corresponds to a coke of unacceptably high reactivity when used in a zinc blast furnace. Usually less than 0.15 gm./sec./cc. is preferred.

Under furnace conditions the ratio of CO to $CO_2$ in the gas at the top of the charge can be used to indicate the amount of carbon being consumed by reaction with $CO_2$. The higher $CO/CO_2$ ratio, other things being equal, the greater is the proportion of the carbon being consumed by reaction with $CO_2$. For example, if 100% of the carbon were burnt by air to CO in the tuyere zone of the furnace the $CO/CO_2$ ratio after reduction of ZnO and other oxides had taken place might typically be 2.5. If, however, only 95% of the carbon were burnt by air to CO and the other 5% reacted with $CO_2$ formed by the reduction reactions, the $CO/CO_2$ ratio would increase to 4.0. Under these latter conditions the net heat available for smelting (i.e. the heat of combustion of CO less the heat endothermically absorbed in the $CO_2+C$ reaction) would be only 85% of the former case. To compensate for this 15% more carbon per unit of zinc would have to be charged to the furnace to get the same rate of zinc volatilisation.

Figure 2:
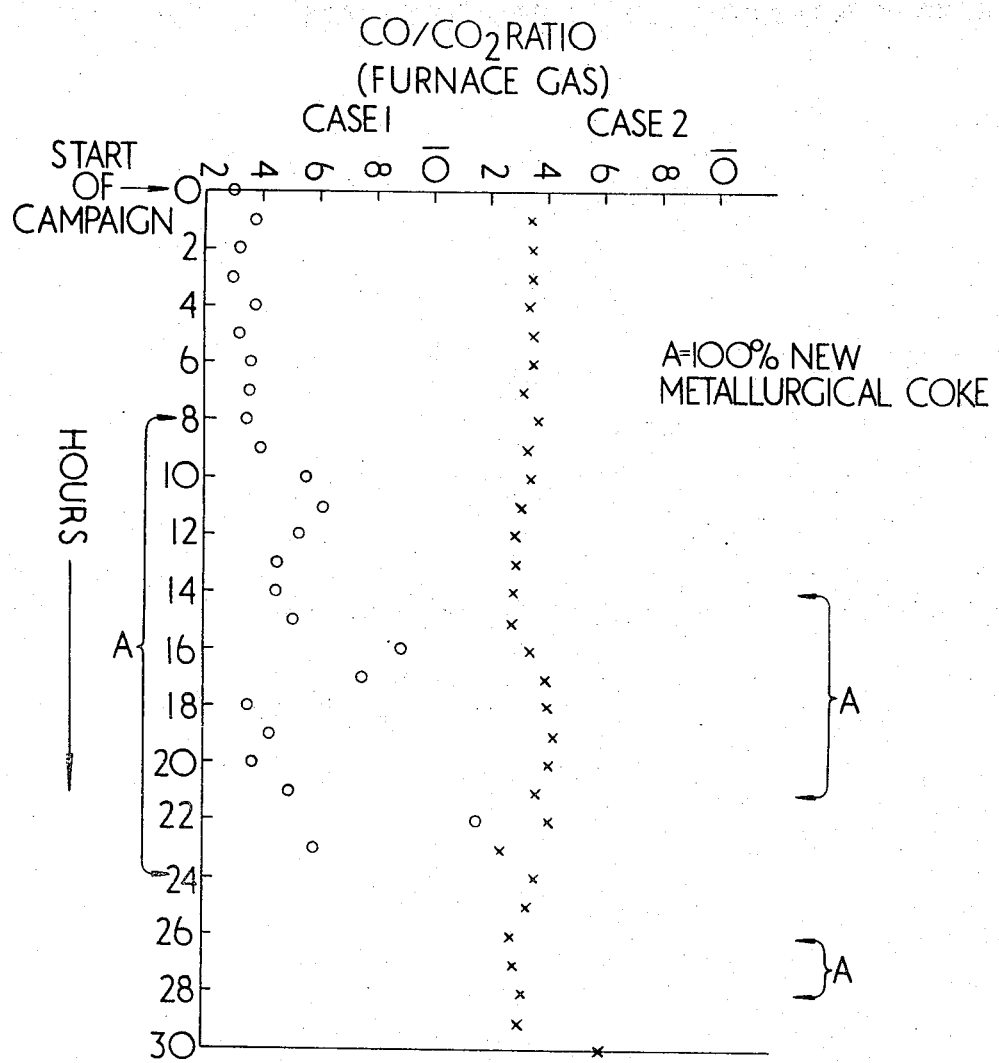

The invention will be further described with reference to the following examples and drawings, wherein FIG. 1 is a graph of weight loss of treated fuel against weight loss of corresponding untreated fuel under specified heating conditions and FIG. 2 is a graph of $CO/CO_2$ ratio in a furnace trial comparing treated and untreated fuel.

EXAMPLE 1

This example illustrates the weight loss of treated and untreated lump coke samples due to reaction with carbon dioxide at 1000° C. In this test the coke sample was heated at 1000° C. in a stream of carbon dioxide and the weight loss is expressed in terms of the percentages of the weight of sample lost per minute. The treated coke was coated by spraying with a 2.5% solution of boric acid in water.

The reactivity of different metallurgical coke (treated and untreated) from different parts of the world were determined at 1000° C. and the results were tabulated in Table 1. (Four samples of each coke are treated separately.)

The extent of deliberate reduction of reactivity, as hereinbefore mentioned, is analysed by statistical analysis of the results obtained, and the analysis is shown in FIG. 1 together with the regression line (correlation coefficient of 0.97) and 95% confidence limits. The regression line equation, thus obtained, is: (Reactivity of treated coke) = $0.659 \times$ (Reactivity of untreated coke) $-0.01$.

EXAMPLE 2

This shows the effect of using coke deactivated by treatment with boric acid solution as feed to a zinc/lead blast furnace. As will be observed from Table 2 and FIG. 2 certain furnace benefits accrue from the use of deactivated coke, more particularly a more constant $CO/CO_2$ ratio during the course of the campaign and improved slag hearth characteristics.

Two furnace trials were separately conducted, one with preformed metallurgical coke without any coating of inorganic salt and the other with preformed metallurgical coke, produced from the same raw materials as in the previous case, with a coating of inorganic salt (2.5% solution of boric acid).

The performances of the blast furnace under the two conditions are referred to as Case 1 (without treatment) and Case 2 (with treatment). The comparative study of the furnace behaviour under the above mentioned two cases can be best understood from the FIG. 2.

As the reactivity of coke is determined by its reaction with $CO_2$ to produce CO (i.e. $C+CO_2 \rightarrow 2\ CO$), the $CO/CO_2$ ratio of the furnace gas is interpreted in terms of furnace performance for efficient smelting of zinc/lead oxidic materials. The general observations, in both cases, are summarised in Table 2.

Thus, from the two furnace trials, it was found that the efficiency of smelting of zinc/lead oxidic materials in a blast furnace can be increased by deliberate reduction of reactivity of coke, prior to charging into the furnace, by putting a physical barrier on the coke surface with an inorganic salt (namely boric acid solution).

TABLE 2

| | Case 1 | Case 2 |
|---|---|---|
| Coke reactivity at 1,000° C. | 0.250% weight loss/min. (untreated). | 0.170% weight loss/min. (treated). |
| Hearth condition | Poor | Normal. |
| Slag condition | Very viscous | Do. |
| Shaft condition | Heavily accreted; uneven acceptance of charge at the top of the furnace due to severe charge hanging. | No accretions; absent of charge hanging and normal furnace charge intake. |

I claim:

1. In a method of smelting zinc in a blast furnace wherein oxidic zinciferous material in lump form and carbonaceous material in lump form are fed to the top of the furnace and a supply of air is fed through tuyeres to the bottom of said furnace, the improvement comprising treating the carbonaceous material with an inorganic barrier material selected from carbon, boric acid, calcium oxide or hydroxide or carbonate, sodium silicate and borax before introduction of said carbonaceous material into the top of the furnace so as to reduce the reactivity of said carbonaceous material to carbon dioxide at 1,000° C., whereby said treated carbonaceous material remains substantially unreactive to carbon dioxide as it descends said shaft, and combusts completely near the bottom of said furnace.

TABLE 1

| | | Percent weight loss/min. | | | | | | | |
|---|---|---|---|---|---|---|---|---|---|
| | | Sample 1 | | Sample 2 | | Sample 3 | | Sample 4 | |
| Coke type | Country of origin | Treated | Untreated | Treated | Untreated | Treated | Untreated | Treated | Untreated |
| A | United States of America | 0.075 | 0.096 | 0.100 | 0.240 | 0.074 | 0.109 | 0.072 | 0.128 |
| B (40–60 mm.) | Italy | 0.048 | 0.090 | 0.088 | 0.174 | 0.088 | 0.161 | 0.065 | 0.139 |
| C | Great Britain | 0.170 | 0.234 | 0.120 | 0.185 | 0.246 | 0.409 | 0.111 | 0.290 |
| B (60–80 mm.) | Italy | 0.040 | 0.068 | 0.082 | 0.150 | 0.066 | 0.120 | 0.079 | 0.131 |
| D | Great Britain | 0.058 | 0.068 | 0.069 | 0.141 | 0.130 | 0.237 | 0.120 | 0.196 |
| E | do | 0.100 | 0.121 | 0.084 | 0.104 | 0.091 | 0.116 | 0.051 | 0.076 |
| F | United States of America | 0.130 | 0.272 | 0.127 | 0.213 | 0.094 | 0.120 | 0.085 | 0.114 |
| G | Great Britain | 0.149 | 0.177 | 0.166 | 0.210 | 0.122 | 0.203 | 0.119 | 0.243 |
| H | do | 0.359 | 0.561 | 0.500 | 0.679 | 0.313 | 0.471 | 0.289 | 0.418 |
| I | do | 0.115 | 0.178 | 0.146 | 0.198 | 0.250 | 0.348 | 0.154 | 0.201 |
| J | do | 0.150 | 0.370 | 0.151 | 0.373 | 0.350 | 0.677 | 0.255 | 0.565 |
| K | do | 0.279 | 0.497 | 0.282 | 0.445 | 0.450 | 0.578 | 0.595 | 0.792 |
| L | do | 0.320 | 0.433 | 0.266 | 0.416 | 0.413 | 0.434 | 0.312 | 0.413 |
| M | Poland | 0.134 | 0.201 | 0.057 | 0.151 | 0.151 | 0.219 | | |
| N | Great Britain | 0.035 | 0.078 | 0.144 | 0.300 | 0.164 | 0.405 | 0.254 | 0.415 |

2. A method as claimed in claim 1 wherein the carbonaceous material is a metallurgical coke in the fired form.

3. A method as claimed in claim 1 wherein the carbonaceous material is briquettes preformed by compression of relatively small-sized starting material.

4. A method as claimed in claim 1 wherein said inorganic barrier material coats the whole lump of fuel.

5. A method as claimed in claim 1 wherein said inorganic barrier material coats the walls of pores or interstices within the lump of fuel.

6. A method as claimed in claim 1 wherein the inorganic barrier material is inert to the smelting process.

7. A method as claimed in claim 6 wherein prior to use in the furnace the lump fuel material has been contacted with an aqueous medium containing said inorganic barrier material and thereafter heated to leave a solid barrier residue.

8. A method as claimed in claim 7 wherein the inorganic barrier material is boric acid.

9. A method as claimed in claim 7 wherein the inorganic barrier material is calcium oxide.

10. A method as claimed in claim 7 wherein the inorganic barrier material is calcium carbonate.

11. A method as claimed in claim 7 wherein the inorganic barrier material is borax.

12. A method as claimed in claim 1 wherein the inorganic barrier material is carbon wherein any pores are of smaller pore size than those of the lump fuel material.

13. A method as claimed in claim 12 wherein prior to use in the furnace the lump fuel material has been contacted with molten pitch and subsequently heated to drive off volatile material and leave a barrier carbon residue wherein any pores are of smaller pore size.

14. A method as claimed in claim 7 wherein metallurgical coke in the fired form has been contacted with the aqueous medium and subsequently heated both to provide the physical barrier material and to provide preheat for the fuel.

15. A method as claimed in claim 7 wherein hot preformed briquettes have been contacted with the aqueous medium whereby this is converted into the inorganic barrier material while the briquettes remain hot enough to be charged as fuel.

16. A method as claimed in claim 6 wherein briquettes are used which have incorporated during their manufacture a suitable material chosen from inorganic acid bases and salts to leave the solid physical barrier residue within the briquette.

References Cited
UNITED STATES PATENTS

| | | | |
|---|---|---|---|
| 2,863,758 | 12/1958 | Crane et al. | 75—4 |
| 869,043 | 10/1907 | Arden | 75—42 |
| 1,148,782 | 8/1915 | Arden | 75—42 X |
| 665,744 | 1/1901 | Picard | 75—86 X |
| 3,073,696 | 1/1963 | Lumsden et al. | 75—87 |
| 3,523,786 | 8/1970 | Loosemore et al. | 75—87 |

OSCAR R. VERTIZ, Primary Examiner

G. A. HELLER, Assistant Examiner